Sept. 4, 1962 J. O. JOHNSON 3,052,214
CONTAINER MEANS
Filed Aug. 16, 1960 2 Sheets-Sheet 1
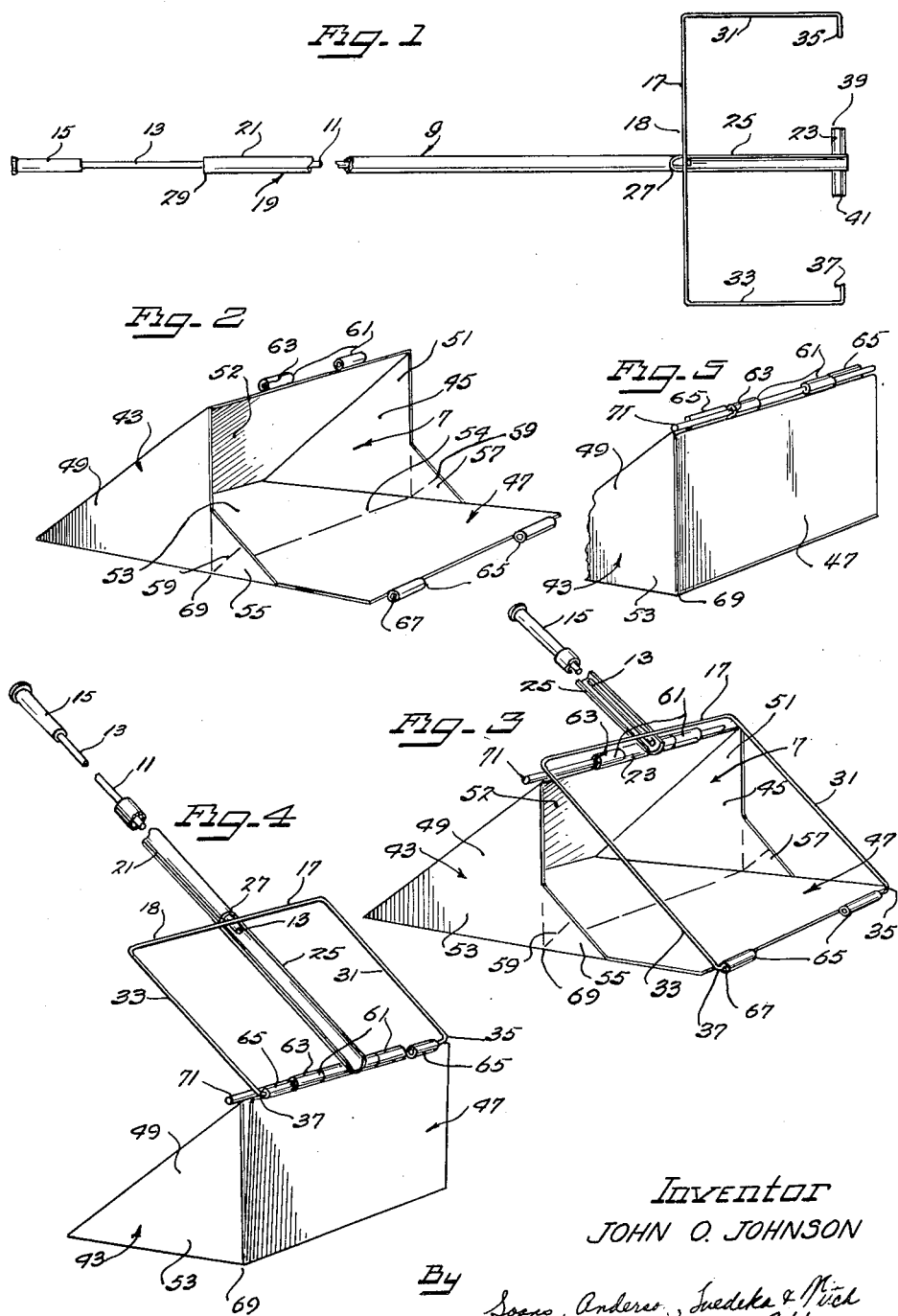
Inventor
JOHN O. JOHNSON

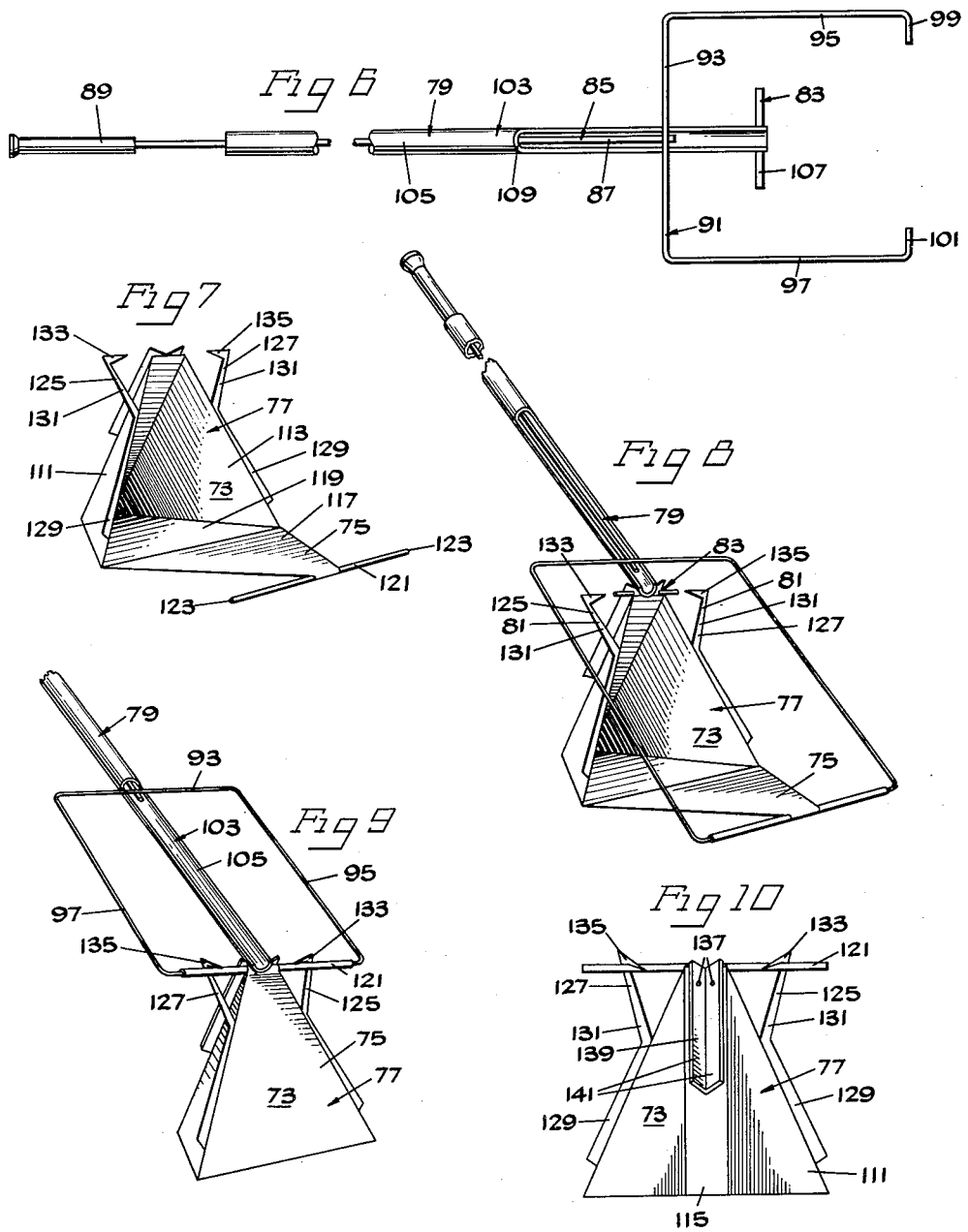

United States Patent Office 3,052,214
Patented Sept. 4, 1962

3,052,214
CONTAINER MEANS
John O. Johnson, 300 E. Morgan Ave., Chesterton, Ind.
Filed Aug. 16, 1960, Ser. No. 49,954
6 Claims. (Cl. 119—1)

The present invention generally relates to containers and more specifically relates to disposable containing means particularly adapted for use in the trapping and containing for disposal of such objectionable substances as animal excrement and the like.

Various devices have been constructed for trapping and containing and for disposing of substances which are unsafe, noxious or otherwise undersirable for handling. In this connection, certain of such devices are particularly adapted for use in the trapping and containing of animal excrement, and for certain other substances, including dust, dirt, certain organic fertilizers and the like. A large proportion of those devices which have been designed for use in the handling of animal excrement, such as dog excrement, comprise large metal tongs, scoops and shovel-like arrangements. Still others comprise containers of the nature of animal toilets.

The described devices have usually been found in practice either to be relatively complicated, expensive and difficult to use, such as most animal toilets, or although relatively simple in design and construction yet somewhat ineffective for the intended purposes or otherwise undesirable, as in the case of most tongs, scoops, etc. For example, implements for picking up excrement have a disadvantage in that they generally allow excrement to accumulate on certain portions thereof, so that odious periodic cleaning of the device is necessitated in order to maintain somewhat sanitary conditions.

Moreover, conventional devices such as tongs, scoops, shovels, etc., do not per se provide means for ready containment and deposit of the trapped excrement, so that garbage cans or other containers must be provided for such containment and disposal, with periodic cleaning, etc., usually being required. Animal toilets do not have this drawback if connected with central sewage systems or the like. However, they are usually relatively expensive and are so poorly designed, either by reason of size, shape or manner of operation, as to be impractical. In this connection, a considerable degree of training of the animal is usually necessary before the toilet can be used with any degree of success. In some instances, the degree or type of training prohibits the practical use of such toilets.

Furthermore, conventional excrement trapping and disposal means are usually designed for either outdoor or indoor use, but not both. In the case of the animal toilet, a separate facility usually inside a home, must be provided for such toilet and the toilet may not be portable. In the case of tongs, scoops, shovels, and the like, these implements are usually designed for outdoor use and are not adapted for suitable use within a house, by reason of accumulation of excrement thereon, or due to the size, design, etc., as inability to trap excrement without scraping the floor, etc. so as to present a danger of injury to the home or its furnishings.

A need has existed for a simple, inexpensive yet effective means for trapping and containing animal excrement and for conveniently disposing of the same, which means is suitable for use both indoors and outdoors and which does not result in the accumulation of excrement on portions thereof and, accordingly, does not need to be cleaned in order to remain in a sanitary condition.

The above-described needs have been satisfied by the novel means of the present invention, particularly adapted for effectively trapping and containing animal excrement for ultimate easy disposal thereof. The novel means of the present invention will hereinafter be referred to as the disposable dog excrement catcher.

It should be understood that although the succeeding description particularly relates to the use of the novel means of the present invention in the trapping, containing and handling of animal excrement for disposal, especially dog excrement, such means can be utilized in the trapping and containing of other objectionable or unwieldy substances, such as dust, dirt, lawn clippings, fertilizer and the like.

Not only is the dog excrement catcher simple and inexpensive to construct and easy to operate, but contains inexpensive disposable components in which it efficiently traps and contains the excrement for final disposal. Such components are easily locked shut, removed from the catcher, disposed of and replaced by fresh components. Accordingly, operation of the catcher is accomplished without necessitating the odious transfer of the excrement from the trapping and containing means to another unit for storage before such final disposal. Thus, it is more convenient and sanitary in use than conventional scoops, shovels, etc. The catcher of the present invention, as previously indicated, can be utilized equally satisfactorily indoors and outdoors in all types of environments without accumulation of excrement on portions thereof. Accordingly, it remains clean and sanitary.

If the dog is to be allowed to excrete within the house, by reason of inclement weather, sickness of the animal, etc., the device of the present invention allows such excretion to take place conveniently and sanitarily. From the moment that the excrement, etc., is trapped within the disposable containing means of the device of the present invention, such excrement, etc., can be kept within such containing means hidden from view and can readily be disposed of. This is a particularly important aesthetic advantage for the average dog owner.

Accordingly, it is the principal object of the present invention to provide improved trapping and containing means. It is also an object of the present invention to provide an improved means for trapping and containing for ultimate disposal of difficultly handleable materials such as animal excrement, dirt, dust, fertilizer, chemicals and the like. It is a further object of the present invention to provide a simple, inexpensive catcher for trapping, including means for containing dog excrement which means can be locked shut, readily removed from the catcher for convenient disposal and replaced, the catcher being readily utilized indoors and outdoors. It is a further object of the present invention to provide an improved disposable means for trapping and containing dog excrement, which means does not require constant cleaning or the like to maintain it in a sanitary condition.

Further objects and advantages of the present invention will be apparent from a study of the following detailed description and the accompanying drawings of which:

FIGURE 1 is a plan view of a portion of a first embodiment of the improved animal excrement catcher of the present invention, particularly designad for use as a trap and container for dog excrement, FIGURE 1 showing the holding and operating means for the animal excrement catcher illustrated in FIGURE 3;

FIGURE 2 is a perspective view of the disposable containing means of the embodiment of the animal excrement catcher of FIGURE 3, suitable for use with the holding and operating means illustrated in FIGURE 1;

FIGURE 3 is a perspective view of the first embodiment of the animal excrement catcher of the present invention in the open position, portions of the holding and operating means being foreshortened for purposes of illustration;

FIGURE 4 is a perspective view of the embodiment of FIGURE 3 in the closed position, portions of the holding and operating means being foreshortened for purposes of illustration;

FIGURE 5 is a perspective view of the disposable containing means of FIGURES 3 and 4 detached from the holding and operating means and with a closure means connected thereto in a manner to retain the disposable containing means in closed position for disposal;

FIGURE 6 is a plan view of the holding and operating means for a second embodiment of the animal excrement catcher, illustrated in FIG. 8;

FIGURE 7 is a perspective view of the disposable containing means of the second embodiment of the animal excrement catcher, as illustrated in FIGURE 8, suitable for use with the holding and operating means illustrated in FIGURE 6;

FIGURE 8 is a perspective view of the second embodiment of the animal excrement catcher of the present invention in the open position, portions of the holding and operating means being foreshortened for purposes of illustration;

FIGURE 9 is a perspective view of the embodiment of FIGURE 8 in the closed position, portions of the holding and operating means being foreshortened for purposes of illustration; and, FIGURE 10 is a perspective view of the disposable containing means of FIGURES 8 and 9 detached from the holding and operating means and locked shut for disposal.

The present invention generally comprises a disposable containing means and a holding and operating means for holding the containing means in operative position and for opening and closing the containing means. The containing means comprises a bag which is of a disposable nature. Closure means are provided for keeping the bag in a closed position, as by locking, for easy disposal of the bag. The closure means may be integral with the bag or separate therefrom and may be fabricated from any suitable material, such as metal, wood, plastic, etc.

More particularly, the bag has a movable lid and may be fabricated from any disposable substance, such as paper, cardboard, cloth, metal, plastic, wood, and the like. The bag has a means to which the holding and operating means is releasably connected for moving the lid and for holding the bag. The holding and operating means comprises a long stick with a handle which is movable forwardly to an open position with the bag lid open and rearwardly to a closed position with the bag lid closed against the bag. The stick may be fabricated of any suitable material, for example, metal, wood, plastic and combinations thereof, etc.

Now referring more particularly to the accompanying drawings, components of a first embodiment of the animal excrement catcher, illustrated in FIGURE 3 and hereinafter referred to as the catcher 7, are illustrated in further detail in FIGURES 1, 2, 4 and 5. In FIGURE 1, a bag holding and operating means for the first embodiment is illustrated and comprises stick portion 9 of the catcher 7. The stick 9 includes a connecting rod 11, comprised of an elongated wire 13 with a handle 15 at one end and a flexible wire pincher or bracket 17 at the opposite end. Bracket 17 may be of any suitable shape and size and preferably comprises a portion 18 extending transversely of the rod 13 across the front end thereof, and forwardly extending arms 31 and 33 disposed on opposite ends of portion 18. Arms 31 and 33 may be provided with inwardly directed and aligned opposed ends 35 and 37, respectively. Bracket 17 may be connected to the end of wire 13 or be disposed on top thereof, as illustrated in FIGURES 3 and 4, as by welding, etc.

The stick 9 also includes a connecting rod holder 19, which comprises an elongated hollow tube 21 of generally cylindrical or other suitable cross section. Means are provided for connecting the tube to the bag. In the embodiment illustrated in FIGURE 1 such means comprise a short, hollow, preferably generally cylindrical tube 23 positioned transversely of the front end of the tube 21 and connected thereto, as by welding, gluing, etc., below said tube 21, as illustrated in FIGURE 1 and also in FIGURES 3 and 4.

Preferably, the tube 21 has a total length approximating that of the rod 11 exclusive of the handle 15. Moreover, preferably the diameter of the handle 15 is larger than the internal diameter of the tube 21. Tube 21 is disposed around the connecting rod 11, with the handle 15 extending beyond the rearward end of the tube and the bracket 17 disposed adjacent the front end of the tube, as described. Assembly of the rod holder 19 with the rod 11 can be readily accomplished by removing the handle 15 from the rod 11 and inserting rod 11 into the passageway in tube 21 from the front end of tube 21, and then sliding rod 11 rearwardly through the tube until the rear end of wire 13 can be engaged by handle 15 for assembly of the latter.

Tube 21 in the area adjacent the front end, that is, the end which is connected to tube 23, as illustrated in FIGURE 1, has the top portion thereof removed. In other words, in cross section in the portion 25 of the tube 21 the tube is semicircular or bisected so that in plan view the wire 13 of the connecting rod 11 is exposed. Thus, the movement of the rod 11 forwardly and rearwardly with respect to the rod holder 19 is limited at the one end by the abutting of the forward end of the handle 15 with the rearward end 29 of the tube 21 and at the opposite end by the end or ledge 27 of the bisected portion 25. In other words, the ledge 27 where the bisected portion 25 of tube 21 terminates rearwardly acts as a stop to prevent further rearward movement of the flexible wire bracket 17, the transverse portion 18 thereof in rearward movement striking said ledge. The inability of the front portion of the handle 15 to enter the passageway at the rear end 29 of tube 21 limits the forward movement of the connecting rod, as previously indicated. The purpose of the tube 23 is to act as a channel means whereby the bag of the dog excrement catcher 7, hereinafter described in more detail, is connected to the rod holder 19. It will be noted that the forwardmost position of the wire bracket 17 is illustrated in FIGURE 3. In the rearwardmost position of the bracket 17, illustrated in FIGURES 1 and 4, the inwardly directed ends 35 and 37, respectively, of the arms 31 and 33 may be aligned with the ends 39 and 41 of the tube 23.

Now referring more particularly to FIGURE 2 of the accompanying drawings, the bag 43 is illustrated. The bag 43 may be fabricated, as previously indicated, from any suitable material, preferably inexpensive, flexible and weight supporting, such as cloth, paper, cardboard, tin foil, plastic, or the like. The bag 43 is preferably disposable. In this connection, it is preferably fabricated of a readily available inexpensive material such as kraft paper which can be readily disposed of by burning or the like.

The bag 43 comprises a receptacle or pouch portion 45 generally in the shape of a right triangular prism, and a lid portion 47 therefor. The lid 47 is preferably generally rectangular in shape and is dimensioned to close the bag. The pouch 45 may be formed of generally vertical sidewalls 49 and 51 which, as illustrated, may be in the form of right triangles, or other suitable shape. A back wall 52 is provided which slopes downwardly and rearwardly from the apices of sides 49 and 51 to a generally rectangular horizontally extending base 53 hingeably connected to the lid 47 along its leading edge 54. The pouch 45 is also hingeably connected to the lid 47 in the area of the lower leading edge of the sidewalls 49 and 51 and the rearward portions of the sides of the lid by generally triangularly shaped portions 55 and 57, each of which has a fold line 59 bisecting the same in the manner illustrated in FIGURE 2. Thus, the lid 47 is pivoted upwardly and rearwardly to approximate the leading edges of pouch 45, and portions 55 and 57 may be folded in upon themselves, as shown in FIGURE 4.

It should be understood that the size and shape of the bag may be varied considerably, that is, the invention is not limited to a bag of the described shape but may be of any suitable shape, such as that set forth in the embodiment illustrated in FIGURES 6 to 10, inclusive. The bag 43 is provided with, as indicated in FIGURES 2 to 5, inclusive, suitable means interconnecting the bag with the bag operating stick portion 9.

The sloping back 52 is provided at its uppermost and forwardmost leading edge with a pair of small, hollow, generally cylindrical holder tubes 61, aligned at spaced intervals along the edge and designed to receive a holding pin. Holder tubes 61 are spaced apart at least the width of the tube 23 of the holding and operating means 9. Each of the holder tubes 61 may be provided adjacent at least one end thereof with a membrane 63 or similar means for snugly retaining or firmly, but releasably holding a pin inserted therethrough. For example, the membrane 63 may be fabricated of cardboard, paper, or the like, so that when a pin punctures the same the pin tends to be gripped around the periphery thereof by the adjacent edges of the membrane held in position within the tube 63. Another pair of attaching means or hollow tubes 65 are disposed along the upper or leading edge of the lid 47. The tubes 65 are spaced outwardly of the tubes 61 when the lid 47 approximates the pouch 45, as illustrated in FIGURE 4. The tubes 65 may be generally cylindrical and may also be provided adjacent their outer ends with membranes 67, such as membrane 63 previously described.

Now referring more particularly to FIGURE 3, the bag 43 is illustrated connected to the stick 9 and in the open position suitable for trapping and receiving excrement, dirt, dust, fertilizer or other materials which it is desired to contain and dispose of. In connecting the bag and the stick together to provide the operative dog excrement catcher of the present invention, the following procedure may be carried out.

The stick may be first moved to its open position, that is, the rod 13 advanced forwardly until the handle 15 abuts the rear end 29 of the tube 21. The bag 43 may be opened so that the lid 47 is in the same plane as base 53 of the pouch 45. The tube 23 of the stick 9 may then be aligned between the holder tubes 61 and a disposable locking means or pin 71, generally of the same shape, for example, circular in cross section, and of sufficient length to pass through the two tubes 61 and through the transverse tube 23, may be passed through such tubes to connect the stick 9 into position with the bag. The pin 71 may be of any suitable stiff material, for example, metal, wood, stiffened cardboard, etc. As previously indicated, it is preferred that membrane 63 be provided adjacent at least one end of each tube 61 so that when the pin 71 is passed longitudinally therethrough, it pierces the membranes 63 and is held more or less rigidly in position by the gripping action of the respective membranes.

The wire bracket 17 is interconnected with the bracket tubes 65 by passing the ends 35 and 37, of the bracket arms 31 and 33, respectively, inwardly into the channels in the outer ends of the respective tubes 65. Preferably, the ends 35 and 37 pierce membranes 67 disposed adjacent the outer ends of tubes 65 so as to be more or less firmly held in position. The lid of the bag is now interconnected with the stick and can be readily moved from an open position to a closed position by movement of the rod 13 and handle 13 back and forth, as desired. The fully operative and interconnected dog excrement catcher assembly is illustrated in FIGURE 3 in the open position, that is, with the lid 47 fully open for reception of the excrement, refuse or the like.

FIGURE 4 illustrates the embodiment of FIGURE 3 but with the bag 43 in a closed position, that is, with the lid 47 vertical so that its upper edge approximates the upper or leading edge of the back portion 52 of the pouch 45. The lid 47 may be moved from the open position illustrated in FIGURE 3 to the fully closed position illustrated in FIGURE 4 merely by moving the rod 11 rearwardly by pulling back on handle 15 to its rearwardmost limit, as set by the position of ledge 27 in tube 21. In moving rearwardly, bracket 17 is stopped by the ledge 27. Connected lid 47 moves from the horizontal or open position rearwardly to a vertical or closed position, pivoting at line 54.

In utilizing the excrement catcher of the present invention, when the dog, cat, or other animal indicates by its characteristic behavior that it is about to excrete, in the case of a dog by circling and/or sniffing and scratching the ground, etc., the excrement catcher of the present invention, suitably dimensioned for the animal, can be grasped by the human operator with one hand on the handle and one hand on the tube 21. The bag 43 can be opened by moving the handle 15 forward, as previously described. With the lid open and in a relatively horizontal position, that is, in the same plane as the base 53, the bag can be placed under the excreting region of the animal, that is, under the base of the pets' tail, so that the excrement is trapped, falling into the bag as it emerges.

After the excretion, the bag 43 can then be closed merely by moving the handle 15 rearwardly to the closed position, as previously indicated. The excrement is thereby contained within the bag 43 for disposal.

The final stage of operation can then be carried out. That is, the disposable bag can be readily detached from the stick and disposed of. This can be readily accomplished merely by holding the bag shut, that is, the handle 15 is held in the closed position, while the ends 35 and 37 are pulled from the respective membranes 67 and channels in bracket tubes 65 to release the lid from engagement with the bracket of the stick 9. Then while still holding the bag closed with the lid 47 shut, the pin 71 is disengaged from within the channels in the aligned tubes 61, 23 and 61. That is, the pin 71 is removed from the channels within said tubes so that the bag 43 is now detached from the stick 9. Stick 9 may be laid aside but the bag is still held shut with the hands. The pin 71 is then placed in the position illustrated in FIGURE 5. That is, the pin 71 is passed in front of the bracket tubes 65 and through the holder tubes 61 so that it holds the lid 47 in locked position against the leading edges of pouch 45. In this position the lid 47 cannot swing forward since, in order to do so, tubes 65 would have to be free to move forward. Their forward movement is blocked by the position of pin 71, as shown in FIGURE 5, across their path.

Accordingly, the bag 43 has been separated from the stick 9 and sealed shut with the excrement, dust, dirt or the like contained therein. Inasmuch as pin 71 and bag 43, including tubes 61 and 65, can be readily fabricated from inexpensive materials, such as paper, paperboard, cardboard, cloth or the like, they can be used for the ultimate disposal of the excrement or the like contained in the bag, there being no necessity for the transfer of such excrement, etc. to another container for disposal. The locked bag, pin and connected tubes can be readily disposed of by placing them in the garbage can, burning them or the like. No mess is involved in their disposal, whatever method is employed. Reuse of the catcher 7 can be readily accomplished, by connecting the stick to a new bag in the previously described manner.

Since the excrement catcher is simple of construction, repair thereof is readily carried out. For example, the wire rod 13 including the bracket 17 can be readily replaced if damaged merely by removing the handle 15 therefrom and removing the rod from the front end of the tube 21, then inserting a new rod 13 and bracket 17 through the same portion of tube 21 and connecting it with the handle 15.

Accordingly, a sanitary, safe, inexpensive and easy to use device is provided for the efficient trapping, containment and removal of dog excrement, dirt, dust, fertilizer, chemicals or the like.

A second embodiment of the animal excrement catcher of the present invention is illustrated in FIGURES 6 to 10, inclusive, of the accompanying drawings. Referring more particularly to FIGURE 8, a catcher 73 is illustrated generally similar to catcher 7, and constructed of similar materials. The lid 75 of the bag 77 thereof is shown held in the open excrement-receiving position by stick 79. Catcher 73 is designed to provide locking means 81 integral with the bag 77 whereby the lid, when in the closed position illustrated particularly in FIGURE 9, can be locked closed to the bag 77 while the bag is still connected to the stick 79. There is no necessity of manually holding a detached bag closed while locking the same.

Moreover, the catcher 73 provides simplified means 83 for interconnecting the stick 79 to the bag 77. The shape of the bag 77 is also different from that of the bag of the first embodiment, and affords certain advantages thereover.

Now referring more particularly to FIGURE 6 of the accompanying drawings, the stick 79 is illustrated in plan view. It is generally similar in components, assembly, construction, size and shape to the stick 9 of the first embodiment, including a connecting rod 85, with its elongated wire 87, rear handle 89 and front bracket 91, the latter comprising a transverse portion 93, forwardly extending arms 95 and 97 with inwardly directed ends 99 and 101. A connecting rod holder 103 is provided, comprising an elongated, hollow cylindrical tube 105 which, however, has means 83 for interconnecting the rod holder and bag, in the form of a short wire 107 connected at the forward end thereof, instead of a tube. The wire 107 may be disposed below tube 105, as shown in FIGURE 8.

The diameter of handle 89 is larger than that of tube 105 and, accordingly, acts as a forward stop for the rod 85. The upper half of the front portion of tube 105 is cut away, as shown in FIGURE 6, to expose a portion of wire 87 in plan view. Movement of the rod 85 rearwardly is limited by a ledge 109 defining the rear boundary of the described cut away portion of the tube 105. Rearward movement of the bracket 91 cannot proceed beyond that point, since the transverse portion 93 of the bracket in rearward movement strikes the ledge 109. The forwardmost position of the bracket 91 with respect to the rod holder 103 is shown in FIGURE 8 and the rearwardmost position in FIGURE 9.

Now referring more particularly to FIGURES 7 and 10 of the accompanying drawings, the bag 77 is illustrated separated from the stick 79. The bag is generally similar in materials, components, construction, and use to the bag of the first embodiment. However, the shape of the bag is a truncated tetrahedron, the rearwardly facing apex of the tetrahedron having been truncated from top to bottom, so that the result is a container having triangularly-shaped sidewalls 111 and 113, a rectangular rear wall 115, and truncated triangular front wall 117 and bottom 119. The front wall 117 is separated from the rest of the bag except at its base, where it joins the bottom 119 and forms the lid 75.

Across the truncated end of the lid 75, as shown in FIGURE 7, is disposed a closure bar 121 which is hollow, of any suitable material, such as metal, wood, plastic, paperboard, etc. and which is preferably provided with membranes 123 at its ends so that ends 99 and 101 can pierce therethrough to be firmly, but releasably engaged thereby in securing the rod 85 to the lid 75. The bar 121 is sufficiently long to engage both flexible locking arms 125 and 127. The lower ends 129 of arms 125 and 127 are secured at the base thereof to the leading edges of the respective sidewalls 111 and 113, as illustrated in FIGURE 7, and the upper ends 131 of which extend upwardly and rearwardly from the uppermost point of attachment to the indicated sidewalls. Arms 125 and 127 are provided with rearwardly directed bar-engaging hooks 133 and 135, respectively, for securing the arms to the bar. When it is desired to lock the lid 75 in place in the bag-closing position, the lid is raised to the bag-closing position shown in FIGURE 10, and the flexible upper ends 131 of the arms 125 and 127 are passed forward around the closure bar 121 so that the hooks 133 and 135 engage the bar. Since the upper ends 131 normally extend rearwardly, the hooks 133 and 135 in the locked position illustrated in FIGURE 10 urge the bar 121 and lid against the adjacent face of the bag, keeping the bag closed. The lid can be locked in place while the bag is connected to the stick or when the bag is separated from the stick.

The lid 75 of the bag 77 is connected to the ends 99 and 101 of the bracket 91 so that the movement of the lid between the open and closed positions can be controlled by the stick 79. The stick 79 is also releasably secured to the bag 77 by means of the wire 107 which engages suitable holes 137 provided in a flexible trough-shaped connector 139. As illustrated in FIGURES 7 and 10, the connector 139 may comprise a strip of metal, cardboard, etc. which is flexible or resilient and which may be bent to a form which is generally V-shaped in transverse cross-section. The connector 139 is connected to the bag along rear wall 115, adjacent the upper end thereof and the described holes 137 are provided in the respective wings 141 of the connector near the upper end thereof. To engage the wire 107 of holder 103 with the connector holes 137, the wire 107 may be slightly bent and/or the flexible wings of the connector may be spread, and the ends of the wire 107 can then be aligned with the adjacent holes 137, after which the wire can be unbent and/or the wings can be returned to their normal position, so that the ends of the wire extend laterally through the holes 137. The reverse procedure can be utilized to disengage the bag and the rod holder.

In assembling the catcher 73, the described attachment of the wire 107 to the connector holes 137 can be carried out. The bracket 91 is slid forward to its forwardmost position and the ends 99 and 101 thereof are positioned so that they engage the ends of bar 121, lid being open and in the position illustrated in FIGURE 7. The ends 99 and 101 pierce membranes 123 and are held firmly in place by the membranes. Accordingly, releasable engagement of the lid 75, bag 77 and stick 79 is achieved and the catcher 73 is operative.

The assembled catcher is illustrated in the fully open position in FIGURE 8 and in the fully closed but unlocked position in FIGURE 9. As previously indicated, the lid 75 can be locked in closed position to the bag 77 while the bag and lid are still connected to the stick. This can be accomplished merely by guiding the upper ends 131 of arms 125 and 127 around bar 121 until the hooks 133 and 135 engage the bar 121, as previously described. Operation of the catcher 73 to open and closed positions in accomplished by movement of rod 85 by handle 89, in the manner described for catcher 7.

Catcher 73 is used to trap excrement, etc. in the same manner as previously described for catcher 7. The bag, after receiving the excrement, etc., can be closed by the lid 75, which can be locked in place, and then the closed and locked bag can be removed from the stick 79 and disposed of, to be replaced by a fresh bag which is attached to the stick and the lid engaged thereby in the previously described manner.

It will be readily apparent that various modifications in the excrement catcher of the present invention can be made. For example, the size and shape of the bag can be readily adapted to a variety of uses. It will be obvious that the size, for example, will somewhat depend on the animal whose excrement is to be trapped and disposed of.

From the foregoing, it is apparent that an improved excrement catcher of novel design, simple and inexpensive construction, and improved operation is provided, the catcher having a disposable lockable bag so that the trapped and contained excrement can be readily sealed and locked within the bag and disposed of without further handling. Various other advantages of the construction of the present invention are as set forth in the foregoing.

Such modifications in the design, construction, and the components of the excrement catcher of the present invention, and in the method of use and assembly thereof as are within the skill of those versed in the art are contemplated as being within the scope of the present invention.

This application is a continuation-in-part of my copending U.S. application, Serial No. 825,301, filed July 6, 1959, now abandoned.

What is to be claimed is the following:

1. A disposable catcher for trapping and containing excrement and the like for disposal thereof, said catcher comprising, in combination, a bag holding and operating means comprising a stick, said stick comprising a connecting rod and a connecting tubular rod holder disposed therearound to limit movement of said rod between a forward lid open and a rearward lid closed position, and a disposable bag readily detachably connected to said stick, said bag comprising a disposable bag body and a movable lid, said lid being readily detachably connected to said connecting rod and said bag body being detachably connected in supporting position to said connecting rod holder, whereby said lid can be moved to open and closed positions by movement of said connecting rod, said bag being readily detached from said stick by detachment of said lid and said bag body from said connecting rod and connecting rod holder, respectively.

2. A disposable catcher for trapping and containing excrement and the like for disposal thereof, said catcher comprising, in combination, a bag holding and operating means comprising a stick, said stick comprising a connecting rod and a connecting tubular rod holder disposed therearound to limit movement of said rod between a forward open position and a rearward closed position, and a disposable bag readily detachably connected to said stick, said bag comprising a disposable bag body and a movable lid, said lid being readily detachably connected to said connecting rod and said bag body being readily detachably connected in supporting position to said connecting rod holder, whereby said lid is movable between opened and closed positions, respectively, by movement of said connecting rod, between forward and rearward positions, respectively, and locking means connecting said rod holder and bag body, said locking means being adaptable for locking said lid to said bag body, said bag being readily detachable from said stick by detachment of said lid and said bag body from said connecting rod and said connecting rod holder, respectively.

3. A disposable catcher for trapping and containing excrement and the like for disposal thereof, said catcher comprising, in combination, a bag holding and operating means comprising a stick, including a connecting rod and a connecting rod holder disposed therearound to limit movement of said rod between a forward lid open position and a rearward lid closed position, said connecting rod including adjacent one end a flexible bracket having a plurality of lid-gripping arms, said connecting rod holder having adjacent its forward end a short, hollow tube, transverse of the line of direction of movement of said rod, and a disposable bag comprising a bag body and a lid, said lid having a plurality of lid tubes disposed along an edge thereof adapted to receive said plurality of lid-gripping arms of said connecting rod, said lid being detachably connected to said connecting rod by detachable connection of said arms with said lid tubes, said bag body being detachably connected to said connecting rod holder by detachable connection between said short transverse tube of said connecting rod holder and a plurality of bag body tubes aligned along a leading edge of said bag body and transversely of the direction of movement of said rod, and a pin detachably connecting said bag body tubes with said short tube, whereby said bag body is held in operative position and said lid is moveable to open and closed positions by movement of said rod and whereby said bag can be readily attached and detached from said stick.

4. A disposable catcher for trapping and containing excrement and the like for disposal thereof, said catcher comprising, in combination, a bag holding and operating means comprising a stick including an elongated connecting rod and an elongated, generally tubular, connecting rod holder disposed therearound to limit movement of said rod between a forward and a rearward position, said connecting rod including adjacent the forward end thereof a flexible wire bracket having a plurality of lid-gripping arms, said connecting rod holder having adjacent its forward end a short hollow tube connected transverse of the line of direction of movement of said rod, and a disposable bag readily attached and detached from said stick and comprising a bag body and lid, said lid having a plurality of lid tubes disposed along an edge thereof adapted to receive said plurality of lid-gripping arms of said connecting rod, said lid tubes being detachably connected to said arms of said connecting rod, said bag body being detachably connected to said connecting rod holder by detachable connection between said short transverse tube of said connecting rod holder and a plurality of bag body tubes aligned along a leading edge of said bag body and transversely of the direction of movement of said rod, and bag locking means including a pin detachably connecting said bag body tubes to said short tube, whereby said bag body is held in operative position, said pin being adapted to lock said lid to said bag body upon detachment of said bag from said rod and said lid from said rod holder, said lid being moveable between open and closed positions by movement of said rod forwardly and rearwardly, respectively.

5. A disposable catcher for trapping and containing excrement and the like for disposal thereof, said catcher comprising, in combination, a bag holding and operating means comprising a stick including a connecting rod and a connecting rod holder disposed therearound to limit movement of said rod between a forward position and a rearward position, said connecting rod including adjacent the forward end thereof a flexible wire bracket having a plurality of lid-gripping arms and a disposable bag readily detachably connected to said stick, said bag comprising a bag body and a moveable lid, said lid having along an edge thereof at least one lid tube adapted to be detachably connected to said bracket lid-gripping arms, and said bag body including means whereby said body is detachably connected in supporting position to said connecting rod holder, and bag locking means including lid tube gripping-arms connected to said bag body, whereby said lid can be locked in bag closing position by said closure arms, said lid being moveable between open and closed positions by movement of said connecting rod between forward and rearward positions, respectively, relative to said connecting rod holder, said bag being readily detached from said stick while locked, said detachment being effected by disengagement of said lid tube and bracket arms and said bag connecting means and said connecting rod holder, respectively.

6. A disposable catcher for trapping and containing excrement and the like for disposal thereof, said catcher comprising, in combination, a bag holding and operating means comprising a stick including a connecting rod and a generally tubular connecting rod holder disposed therearound to limit movement of said rod between a forward lid-opening position and a rearward lid-closing position, said connecting rod including adjacent the forward end thereof a flexible wire bracket having a plurality of lid-gripping arms, said connecting rod holder having adjacent the forward end thereof a short connector disposed transverse of the line of direction of movement of said rod, and a disposable bag comprising a bag body and a lid, said lid having a lid tube disposed along an edge thereof and adapted to receive said plurality of lid-gripping arms of said connecting rod, said lid being connected to said connecting rod, through said lid-gripping arms, said bag body also including adjacent the upper end thereof a bracket detachably connected to said short transverse connector of said connecting rod holder, and bag locking means comprising a plurality of arms secured to said bag body and adapted to detachably engage said lid tube to hold said lid against said bag body in bag closing position, said bag body being held in operative position, and said lid being moveable between open and closed positions by movement of said rod between forward and rearward positions, respectively, relative to said rod holder, said bag being readily attached to said stick and detached from said stick for disposal.

References Cited in the file of this patent

UNITED STATES PATENTS

| | | |
|---|---|---|
| 873,213 | Courtney | Dec. 10, 1907 |
| 1,169,939 | Dupre | Feb. 1, 1916 |
| 2,219,216 | Anderson | Oct. 22, 1940 |
| 2,522,471 | Underwood | Sept. 12, 1950 |

FOREIGN PATENTS

| | | |
|---|---|---|
| 351,866 | Germany | Apr. 13, 1922 |